US005907264A

United States Patent [19]
Feldman

[11] Patent Number: 5,907,264
[45] Date of Patent: May 25, 1999

[54] POWER RECYCLING FOR MODULATING ARRAY TRANSMITTERS

[75] Inventor: David Feldman, San Diego, Calif.

[73] Assignee: Lockheed Martin Corporation, Bethesda, Md.

[21] Appl. No.: 09/030,491

[22] Filed: Feb. 25, 1998

[51] Int. Cl.$^6$ .............................. H03C 5/00; H04L 27/36
[52] U.S. Cl. ............................................ 332/103; 375/298
[58] Field of Search ..................................... 332/103, 104, 332/105; 375/261, 279, 298, 308

[56] References Cited

U.S. PATENT DOCUMENTS 5,568,088  10/1996  Dent et al. ................................ 330/151

*Primary Examiner*—David Mis
*Attorney, Agent, or Firm*—Kenneth W. Float

[57] ABSTRACT

A modulating array transmitter that employs a power recycling method and power recovery circuit. The modulating array transmitter uses a plurality of multiphase power stages to generate a multi-point QAM constellation. Outputs of the plurality of multiphase power stages are combined in an output power combiner. The output power combiner uses terminating resistors on its difference power port(s). Using the present invention, power normally dissipated in the terminating resistors is recovered. Instead of dissipating this difference RF power, the present invention converts this power to DC power using rectifiers of the power recovery circuit. The rectified DC power may be used to supplement the DC power required for power amplifiers in the multiphase power stages. In this manner, the difference power is "recycled" and thus may be reused.

5 Claims, 3 Drawing Sheets

POWER RECYCLING FOR MODULATING ARRAY TRANSMITTERS

BACKGROUND

The present invention relates generally to modulating array transmitters, and more particularly, to a power recycling method and power recovery circuit for use with modulating array transmitters that improves the prime power efficiency.

A modulating array transmitter developed by the assignee of the present invention is disclosed in U.S. Pat. No. 5,612,651, entitled "Modulating Array QAM Transmitter", discloses the combination of saturated phase shift key modulated power stages (comprising a phase shift keyer driving a power amplifier) that produce various constellations of amplitude-phase keyed digital signal constellations. For many of the smaller amplitude output power states, pairs of power stages are combined so that their output signals cancel. Since these states require full prime power to drive the power amplifiers and since their outputs do not contribute to useful output power, these states result in a decrease in prime power efficiency.

Accordingly, it is an objective of the present invention to provide for a power recycling method and power recovery circuit for use with a modulating array transmitter that improves the prime power efficiency.

SUMMARY OF THE INVENTION

To meet the above and other objectives, the present invention provides for a power recycling method and power recovery circuit for use with modulating array transmitters. A typical modulating array transmitter uses a plurality of multiphase (e.g., quadraphase) power stages to generate a multi-point (e.g., QAM) constellation. Outputs of the plurality of multiphase power stages are combined in an output power combiner. The output power combiner uses terminating resistors on its difference power port(s). Using the present invention, power normally dissipated in the terminating resistors is recoverable.

The present modulating array transmitter employs a power recycling method and power recovery circuit. The modulating array transmitter uses the plurality of multiphase power stages to generate a multi-point constellation. Outputs of the plurality of multiphase power stages are combined in an output power combiner. The output power combiner uses terminating resistors on its difference power port(s). Using the present invention, power normally dissipated in the terminating resistors is recovered. Instead of dissipating this difference RF power, the present invention converts this power to DC power using rectifiers of the power recovery circuit. The rectified DC power may be used to supplement the DC power required for power amplifiers in the multiphase power stages. In this manner, the difference power is "recycled" and thus may be reused.

It should be understood that any realistic implementation of the power recovery circuit will not operate at 100% efficiency, and it will dissipate part of the recovered difference power. It is nevertheless practical to implement such a power recovery circuit given that 25% or more of the difference power may be recycled. In some configurations of modulating array transmitters developed by the assignee of the present invention, power levels equal to the useful RF output power appear at the difference port(s). Even with only 25% recovery of this difference power, a substantial improvement in overall transmitter prime power efficiency is obtained.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
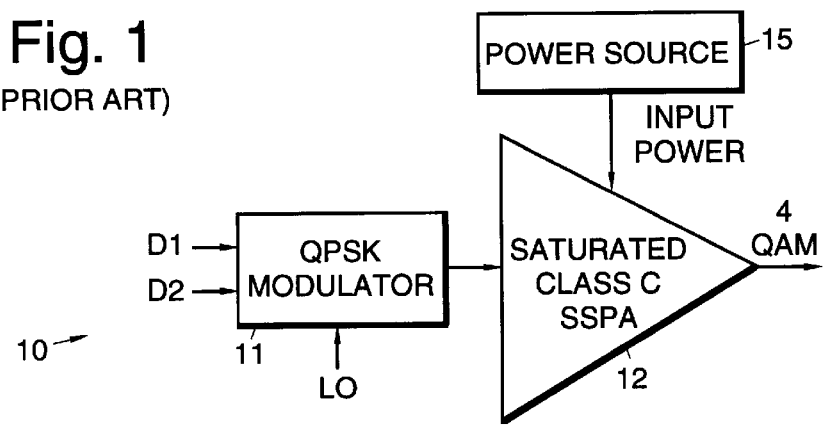
FIG. 1 illustrates a single quadraphase power element that may be used to produce a modulating array transmitter.
Figure 2:
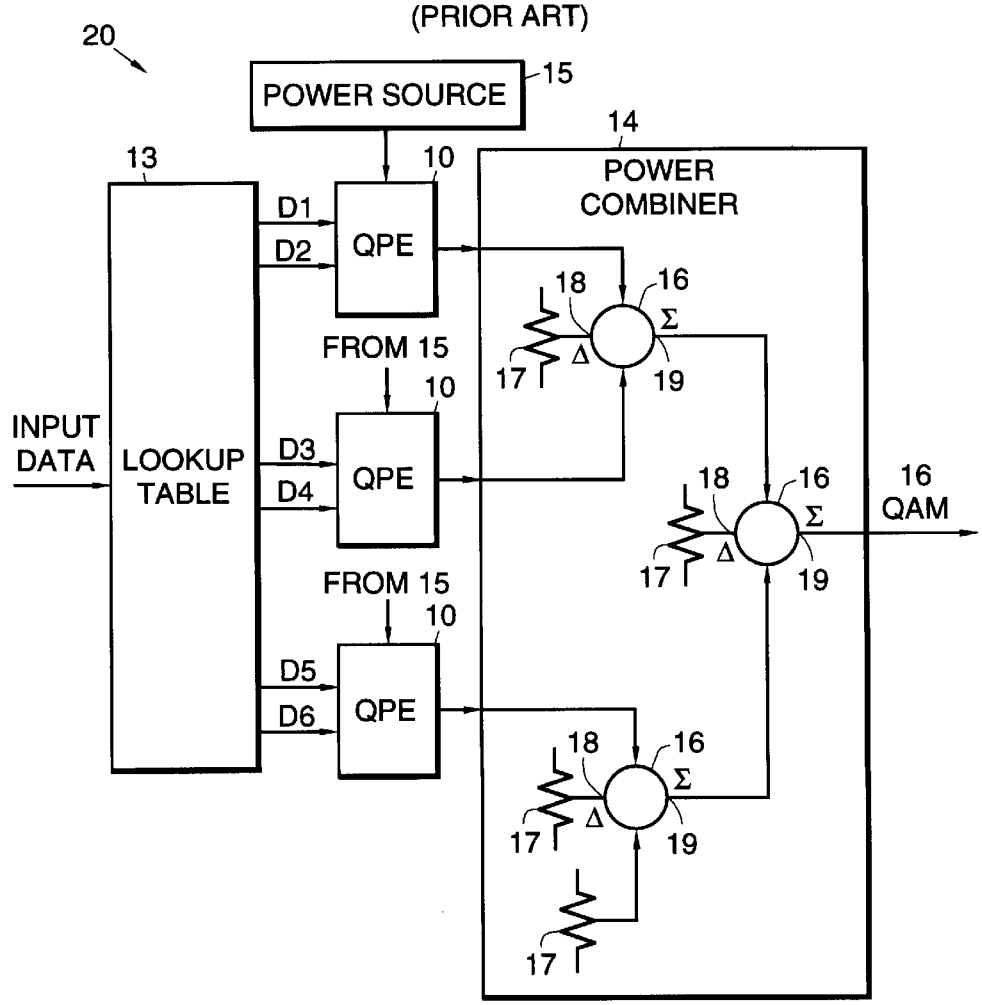
FIG. 2 illustrates an exemplary modulating array transmitter using three quadraphase power elements to generate a 16 point QAM constellation and whose power efficiency is improved by the present invention.

Referring to the drawing figures, FIG. 1 illustrates an exemplary single quadraphase (multiphase) power stage 10 that may be used to produce a modulating array transmitter 20 (shown in FIG. 2). The exemplary quadraphase power stage 10 is comprised of a QPSK modulator 11 having first and second data inputs for receiving digital input signals D1, D2, and a local oscillator (LO) input for receiving a local oscillator reference input signal. The QPSK modulator 11 operates to phase key the local oscillator (LO) reference input signal in accordance with the values of the two digital input signals D1, D2. The QPSK modulator 11 is coupled to a saturated Class C solid state power amplifier (SSPA) 12. The saturated Class C solid state power amplifier 12 is coupled to a power source 15 that provides input power thereto. The output of the Class C saturated solid state power amplifier 12 is a four state quadrature phase shift keyed constellation (QPSK) comprising an I, Q signal constellation.

FIG. 2 illustrates an exemplary modulating array transmitter 20 using three exemplary quadraphase power stages 10 shown in FIG. 1 to generate a 16 point QAM constellation and whose power efficiency is improved by the present invention. The embodiment of FIG. 2 is illustrative of but one embodiment of a transmitter 20 that may utilize the power recycling technique of the present invention.

In general, the modulating array transmitter 20 comprises an array of nearly identical solid state power amplifiers 12 coupled to an efficient means 14, such as an output power combiner 14 comprising a plurality of combiner elements 16, for coherently combining output signals from the solid state power amplifiers 12. The output signals from first and second solid state power amplifiers 12 are coupled to input ports of a first combiner element 16. The output signals from a third solid state power amplifier 12 are coupled to a first input port of a second combiner element 16. A terminating resistor 17 is disposed on the second input port of the second combiner element 16.

The output signals from the first and second combiner elements 16 taken from their sum ports ($\Sigma$) 19 are input to a third combiner element 16 which combines the signals to generate a 16 point QAM constellation. The output power combiners 14 have terminating resistors 17 on its difference power ports ($\Delta$) 18. Each solid state power amplifier 12 is driven by one QPSK modulator 11, in the manner shown in FIG. 1, and each of the plurality of QPSK modulators 11 is driven by a digital mapping lookup table 13. The power amplifiers 12 are driven by the RF excitation signal output from the QPSK modulator 11.

Figure 3:
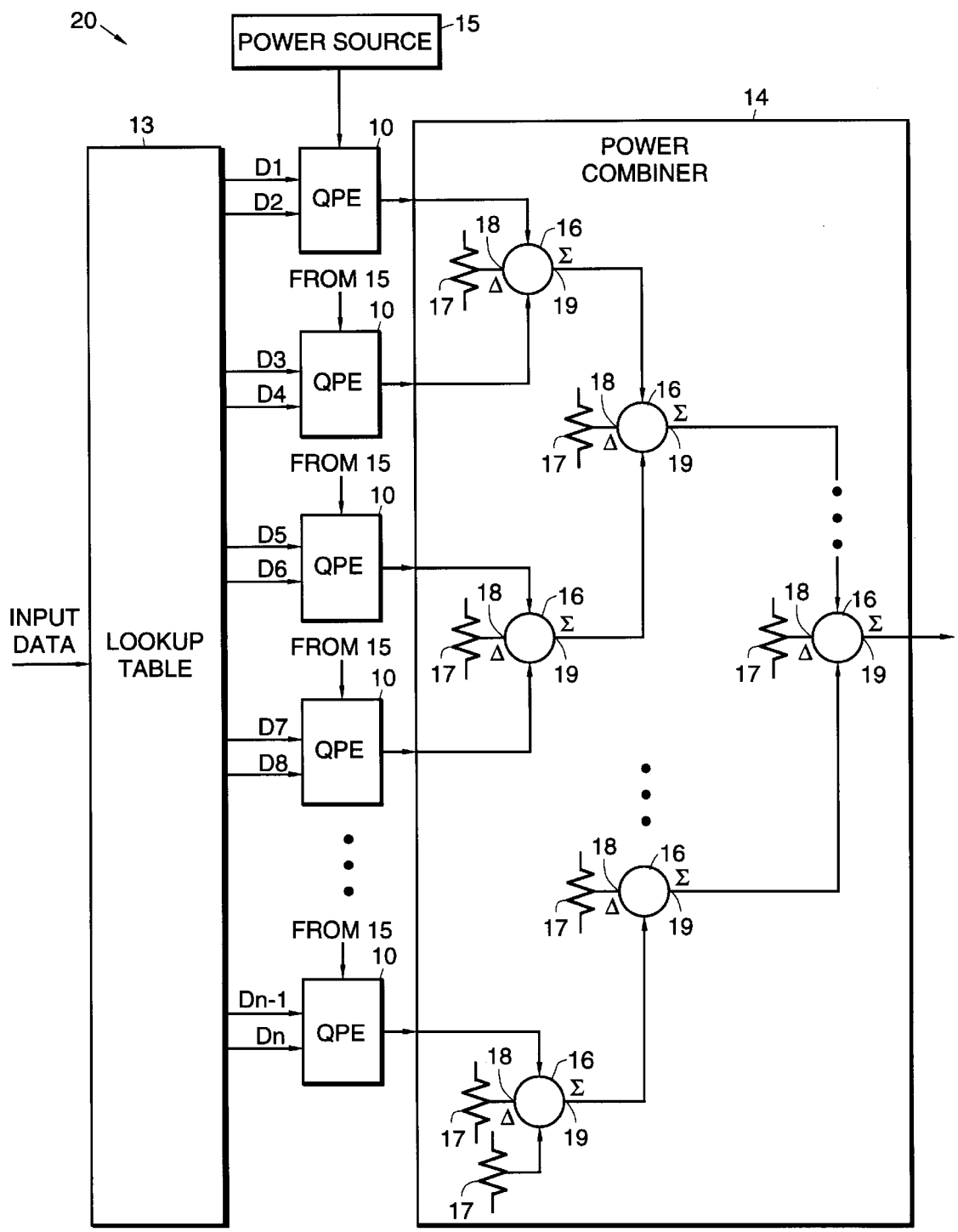
FIG. 3 illustrates a multi-element modulating array transmitter without power recycling.

FIG. 3 illustrates a multi-element modulating array transmitter 20 without power recycling. The multi-element modulating array transmitter 20 of FIG. 3 is constructed in a manner substantially the same as the transmitter 20 described with reference to FIG. 2, but with additional combiner elements 16 provided to combine the signals from the additional power amplifiers 12. In this multi-element modulating array transmitter 20, the output power combiners 14 have terminating resistors 17 on their difference power ports 18, as was done in the three power element embodiment of FIG. 2.

Figure 4:
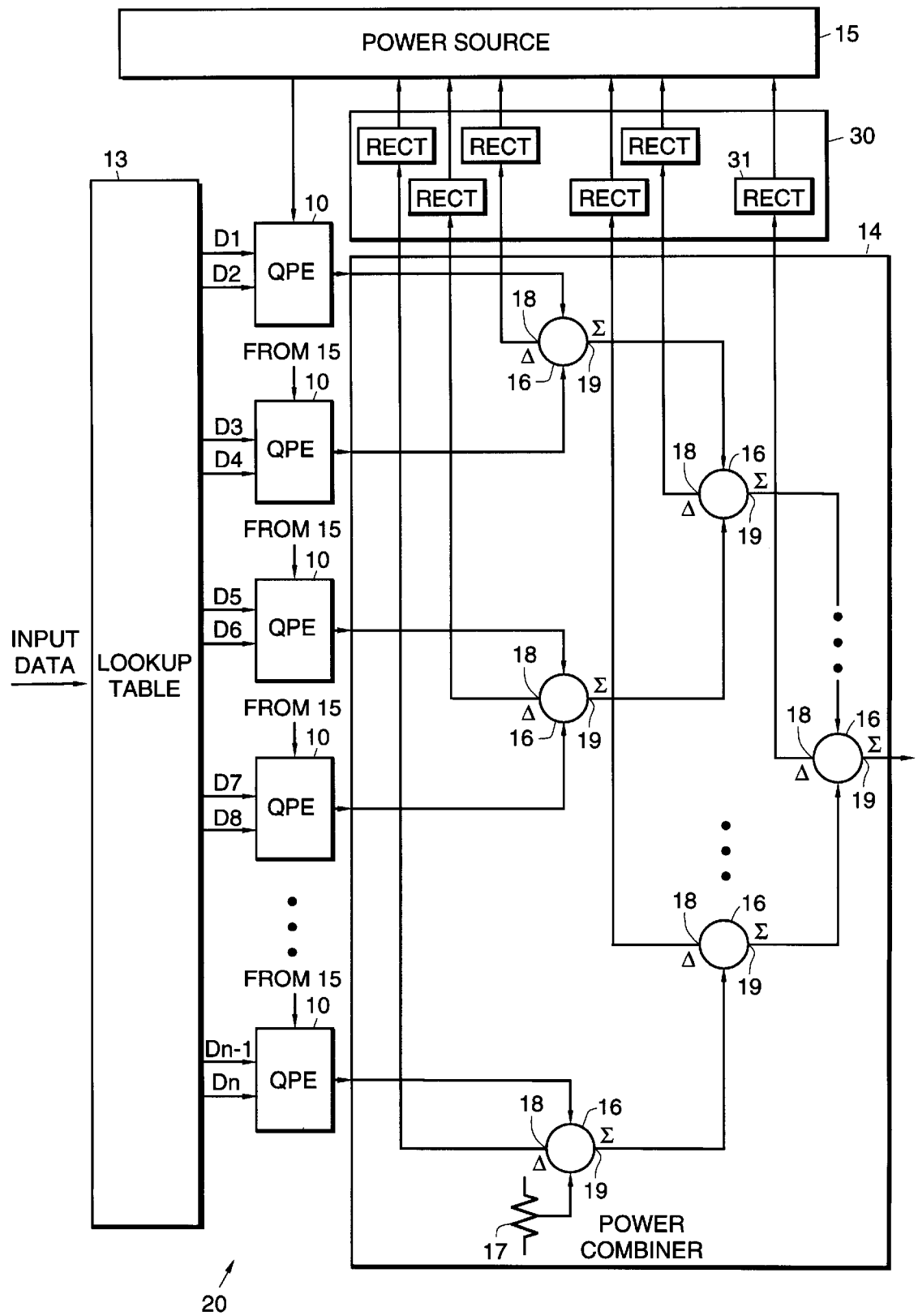
FIG. 4 illustrates a power recycling technique in accordance with the principles of the present invention for use with the multi-element modulating array transmitter of FIG. 3 that improves the prime power efficiency of the transmitter.

FIG. 4 illustrates a power recycling technique embodied in a power recovery circuit 30 in accordance with the principles of the present invention used in conjunction with the multi-element modulating array transmitter 20, such as the transmitter 20 shown in FIG. 3. However, it is to be understood that the present power recycling technique is designed for use with any modulating array transmitter, including transmitters 20 that generate different sets of multi-point constellations, and will improve the prime power efficiency of any appropriate transmitter 20 in which it is employed.

A typical modulating array transmitter 20 developed by the assignee of the present invention is disclosed in U.S. Pat. No. 5,612,651, entitled "Modulating Array QAM Transmitter", the contents of which are incorporated herein by reference. Referring to FIG. 4, the modulating array transmitter 20 uses a combination of saturated phase shift key modulated power stages 10 that comprises a phase shift keyer such as is embodied in the QPSK modulator 11 shown in FIG. 1, driving a power amplifier 12 to produce various constellations of amplitude-phase keyed digital signal constellations. Power for each power amplifier 12 is derived from the prime power source 15. For many of the smaller amplitude output power states of the transmitter 20, pairs of power stages 10 are combined so that their output signals cancel. Since these states require full prime power of the power source 15 to drive the power amplifiers 12, and since their outputs do not contribute to useful output power, these states normally result is a decrease in prime power efficiency of the power source 15.

The output power combiners 14 used in the transmitter 20 of FIG. 4 have terminating resistors 17 on their difference power ports 18. In accordance with the present invention, this power is recoverable using the power recovery circuit 30. Instead of dissipating this difference RF power in the terminating resistors 17, the present invention converts this power to DC power using rectifiers (RECT) 31 that are part of the power recovery circuit 30 and that are coupled between the difference power ports 18 of the respective combiner elements 16 and the prime power source 15. The rectified DC power may be used to supplement the DC power required for the power amplifiers 12, which is generated by the prime power source 15. In this manner, the difference power (i.e., the power dissipated in the terminating resistors 17) is "recycled" and may be reused by the prime power source 15.

It is understood that any realistic implementation of the power recovery circuit 30 will not operate at 100% efficiency, and it will dissipate part of the recovered difference power. It is nevertheless practical to implement such the power recovery circuit 30 given that 25% or more of the difference power may be recycled. In some configurations of modulating array transmitters 20 developed by the assignee of the present invention, power levels equal to the useful RF output power provided by the transmitter 20 appear at the difference port(s) 18. Even with only 25% recovery of this difference power, a substantial improvement in overall transmitter prime power efficiency is obtained.

Thus, a power recycling method and power recovery circuit for use with a modulating array transmitter that improves the prime power efficiency of the transmitter have been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention. In particular, variations of the teachings described herein may be used to perform the present invention.

What is claimed is:

1. A modulated array transmitter having improved power efficiency comprising:
    a prime power source;
    a plurality of multiphase power stages that each comprise:
        a modulator having first and second data inputs for receiving digital input signals, for modulating the reference input signal in accordance with the digital input signals to output a modulated RF excitation signal; and
        a Class C power amplifier coupled to the modulator for receiving the modulated RF excitation signal therefrom and coupled to the prime power source for receiving power therefrom, and for outputting an amplified quadrature amplitude modulated output signal;
    a power combiner coupled to the plurality of multiphase power elements that comprises a plurality of combining elements that each comprise a difference port having a terminating resistor coupled thereto, for combining the amplified quadrature amplitude modulated output signals derived from the plurality of multiphase power elements to output a quadrature amplitude modulated output constellation containing a plurality of symbols; and
    a power recovery circuit coupled between the difference power ports and the prime power source;
    and wherein selected pairs of power amplifiers that are driven with opposing phases to form certain symbols, and power supplied to these pairs of power amplifiers are dissipated in terminating resistors on difference power ports of the power combiner, and wherein this power is recovered in the power recovery circuit to conserve prime power provided to the transmitter.

2. The transmitter of claim 1 wherein the Class C power amplifiers comprise saturated Class C power amplifiers.

3. The transmitter of claim 1 wherein the power recovery circuit comprises a plurality of rectification circuits coupled between respective ones of the terminating resistors and the prime power source.

4. In a modulated array transmitter comprising a prime power source, a plurality of multiphase power stages that each comprise a modulator for modulating a reference input signal in accordance with a plurality of the digital input signals to produce a modulated RF excitation signal, and a Class C power amplifier for receiving the modulated RF excitation signal and for receiving power from the prime power source, for outputting an amplified quadrature amplitude modulated output signal, means for outputting a plurality of digital input signals to each modulator, and a power combiner coupled to the plurality of multiphase power stages that comprises a plurality of combining elements that each have a difference port and a terminating resistor coupled thereto, for combining the amplified QPSK output signals derived from the plurality of multiphase power elements to produce a multiphase amplitude modulated output constellation containing a plurality of symbols, a method of improving the efficiency of the modulated array transmitter that comprises the steps of:

coupling a power recovery circuit between respective terminating resistors of the power combiner and the prime power source; and for selected pairs of power amplifiers that are driven with opposing phases to form certain symbols, coupling power dissipated in terminating resistors on difference power ports of the power combiner back to the prime power source to conserve prime power provided to the transmitter.

5. The method of claim 4 wherein the step of coupling the power recovery circuit comprises the step of coupling a power recovery circuit comprising a plurality of rectification circuits between respective ones of the terminating resistors of the power combiner and the prime power source.

\* \* \* \* \*